United States Patent
Rumer et al.

(10) Patent No.: US 10,077,038 B2
(45) Date of Patent: Sep. 18, 2018

(54) METHOD FOR DETECTING AN INCORRECT INSTALLATION OF BRAKE LINES

(71) Applicant: AUDI AG, Ingolstadt (DE)

(72) Inventors: Wolfgang Rumer, Baar-Ebenhausen (DE); Werner Schneider, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 97 days.

(21) Appl. No.: 15/308,523

(22) PCT Filed: Apr. 11, 2015

(86) PCT No.: PCT/EP2015/000764
§ 371 (c)(1),
(2) Date: Nov. 2, 2016

(87) PCT Pub. No.: WO2015/169419
PCT Pub. Date: Nov. 12, 2015

(65) Prior Publication Data
US 2017/0057484 A1    Mar. 2, 2017

(30) Foreign Application Priority Data

May 3, 2014 (DE) .......... 10 2014 006 584

(51) Int. Cl.
*B60T 17/22* (2006.01)
*B60T 8/88* (2006.01)
*B60T 8/48* (2006.01)

(52) U.S. Cl.
CPC ............ *B60T 17/221* (2013.01); *B60T 8/885* (2013.01); *B60T 17/22* (2013.01); *B60T 8/4872* (2013.01); *B60T 2270/406* (2013.01)

(58) Field of Classification Search
CPC ........ B60T 17/221; B60T 8/885; B60T 17/22; B60T 2270/406; B60T 8/4872
See application file for complete search history.

(56) References Cited

U.S. PATENT DOCUMENTS 5,806,939 A * 9/1998 Feigel ................. B60T 8/1755
                                                    303/113.5
5,935,186 A    8/1999 Yamazaki et al.
(Continued)

FOREIGN PATENT DOCUMENTS

DE    196 47 436 A1    5/1997
DE    196 03 863 A1    8/1997
(Continued)

OTHER PUBLICATIONS

Translation of JP2002308087. Obtained via ESPACENET on Apr. 10, 2018. (Year: 2002).*
(Continued)

*Primary Examiner* — Jeffrey C Boomer
(74) *Attorney, Agent, or Firm* — Henry M. Feiereisen LLC

(57) ABSTRACT

In a method for detecting an incorrect installation of brake lines of a brake system for a multi-axle motor vehicle, a tandem brake master cylinder, connected by the brake lines to primary and secondary circuits of the brake system, is actuated to completely fill a primary reservoir of a primary circuit and a secondary reservoir of a secondary circuit of the brake system. The primary and secondary circuits are associated to wheel brakes of a first and second axles, respectively, and provide brake fluid volumes, of which the primary circuit is greater. Outlet valves of the primary and secondary circuits are then closed, and actuation of the tandem brake master cylinder is still maintained to thereby decelerate a revolving wheel of the first axle and determine a braking behavior. A measuring device indicates whether (Continued)

the brake lines are correctly or incorrectly installed as a function of the braking behavior.

6 Claims, 1 Drawing Sheet

(56) References Cited

U.S. PATENT DOCUMENTS

| | | | | |
|---|---|---|---|---|
| 6,249,736 | B1* | 6/2001 | Schmidt | B60T 7/12 |
| | | | | 303/115.2 |
| 6,824,227 | B1* | 11/2004 | Kiesewetter | B60T 7/042 |
| | | | | 303/113.4 |
| 7,896,448 | B2* | 3/2011 | Bareiss | B60T 8/4872 |
| | | | | 303/1 |
| 9,403,518 | B2* | 8/2016 | Strengert | B60T 8/246 |
| 2006/0138861 | A1* | 6/2006 | Buschmann | B60T 8/34 |
| | | | | 303/122.08 |
| 2007/0252098 | A1* | 11/2007 | Schmidt | B60T 8/36 |
| | | | | 251/129.01 |
| 2012/0299367 | A1* | 11/2012 | Ross | B60T 8/4872 |
| | | | | 303/3 |

FOREIGN PATENT DOCUMENTS

| | | |
|---|---|---|
| DE | 198 27 943 A1 | 8/1999 |
| DE | 10 2011 081 240 A1 | 4/2012 |
| DE | 10 2013 203 189 A1 | 9/2013 |
| DE | 11 2011 105 331 T5 | 3/2014 |
| EP | 0 933 275 A2 | 8/1999 |
| EP | 0 937 618 A2 | 8/1999 |
| EP | 0 965 509 A2 | 12/1999 |
| EP | 2 671 769 A1 | 12/2013 |
| JP | 2002-308087 A1 | 10/2002 |
| JP | 2010-105431 | 5/2015 |

OTHER PUBLICATIONS

Translation of DE19827943. Obtained via ESPACENET on Apr. 6, 2018. (Year: 1999).*
English International Search Report issued by the European Patent Office in International Application PCT/EP2015/000764.

* cited by examiner

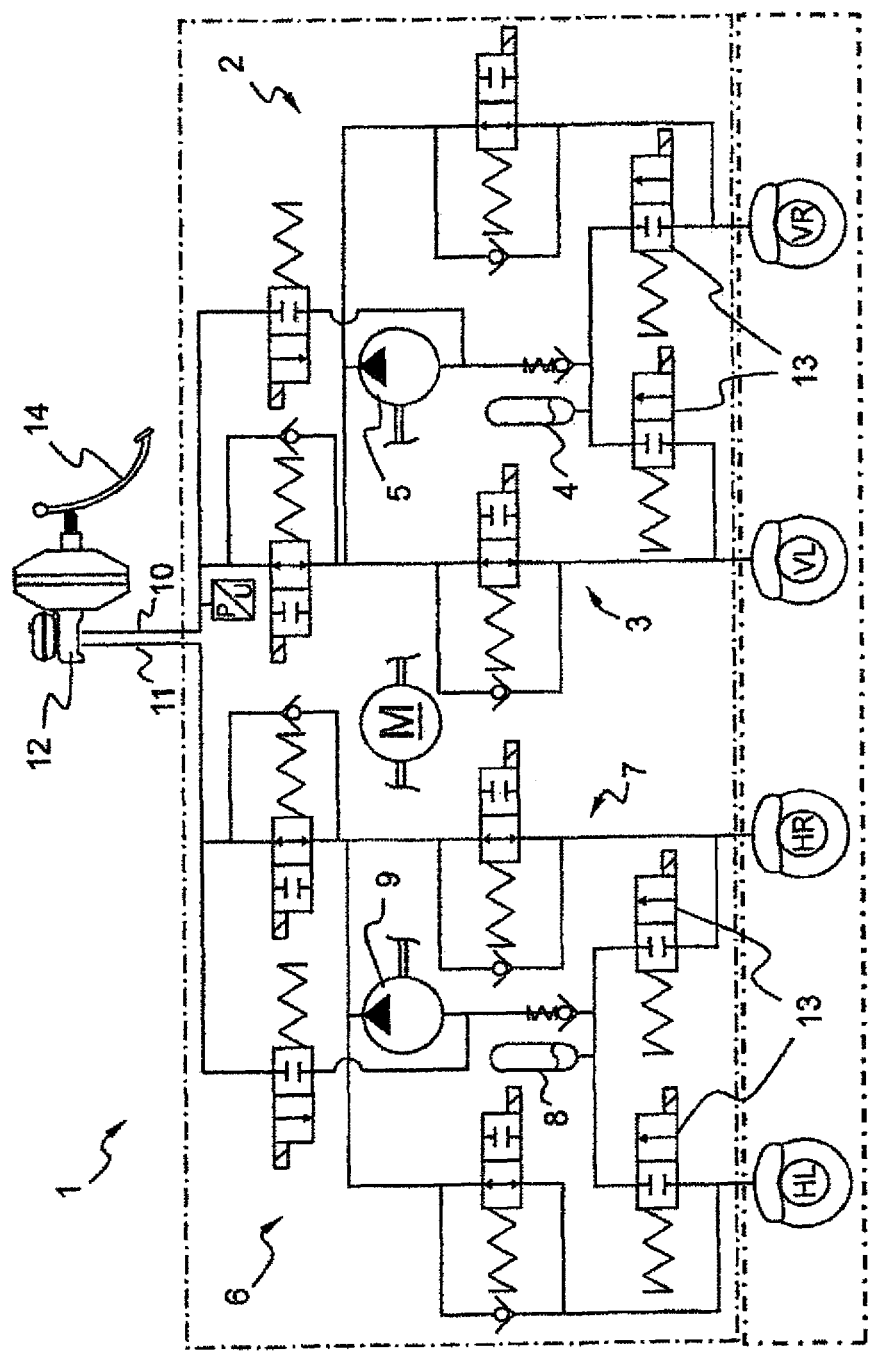

METHOD FOR DETECTING AN INCORRECT INSTALLATION OF BRAKE LINES

CROSS-REFERENCES TO RELATED APPLICATIONS

This application is the U.S. National Stage of International Application No. PCT/EP2015/000764, filed Apr. 11, 2015, which designated the United States and has been published as International Publication No. WO 2015/169419 and which claims the priority of German Patent Application, Serial No. 10 2014 006 584.7, filed May 3, 2014, pursuant to 35 U.S.C. 119(a)-(d).

BACKGROUND OF THE INVENTION

The present invention relates to a method for detecting an incorrect installation of brake lines of a brake system for a multi-axle motor vehicle, with the brake system including a primary circuit including a first ESP subsystem which is comprised of a primary reservoir for brake fluid and at least one outlet valve, with the primary circuit being associated to the wheel brakes of a first axle, and a secondary circuit including a second ESP subsystem which is comprised of a secondary reservoir for brake fluid and at least one outlet valve, with the secondary circuit being associated to the wheel brakes of a second axle, with the primary circuit providing a greater brake fluid volume than the secondary circuit, and with two brake lines connecting a tandem brake master cylinder to the primary circuit and the secondary circuit, respectively.

The brake system of a motor vehicle is used for the hydraulic actuation of the service brakes of the wheels to decelerate the moving motor vehicle, or to hold the latter at a standstill. According to the standard DIN 74000, a redundant design of the brake system with two brake circuits is mandatory. Of all possible variants, only the diagonal split (also called X-split), each with a brake circuit for the diagonally opposite wheels for each axle, and the front-rear split (also called TT or II-split), respectively including a brake circuit per axle has prevailed in practice. A brake pedal acts on the tandem brake master cylinder, from which two separate brake lines are led to each one brake circuit, each with a subsystem of the ESP system ("electronic stability program" or also called ESC system "Electronic Stability Control"). The brake system is filled with a brake fluid.

Since one axle, in particular the front axle is able to transfer more force between tire and roadway as a result of the axle load shift during deceleration of the motor vehicle or the arrangement of the drive unit in the motor vehicle, the volume of this brake circuit is dimensioned greater volume than the volume of the brake circuit of the other axle, in particular the rear axle, when a front-rear split is involved. This results in a primary circuit with higher volume and a secondary circuit with lesser volume. Any interchange of the two brake lines during assembly is not detectable during normal operation of the motor vehicle. Only when the load on the brake system increases does the volume of the brake fluid at the front axle become exhausted much earlier than anticipated, i.a. due to "fading" (drop in the friction effect of the brake pad of the service brake under temperature influence).

JP 2002308087 A2 discloses a method for detecting an incorrect installation of brake lines in a brake system. A control device has a drive to cause a wheel to rotate at a required angular velocity. A speed measuring device is configured to determine the angular velocity of the wheel. A brake control device can exert a defined braking force upon the wheel. As a result of the change in the angular velocity after application of the braking force, a test device can determine whether the installation of the brake lines was correct.

JP 2010105431 A2 relates to a method for detecting an incorrect installation of brake lines in a brake system. Shut-off valves are respectively arranged in one of the two lead brake lines, which are connected to a primary cylinder or to a secondary cylinder of a tandem brake master cylinder. A pressure sensor is arranged in at least one of the two return brake lines, which connect the secondary cylinder to the brake pistons of the wheel brakes. The primary cylinder generates brake fluid pressure in an alternating state of the shut-off valves and the pressure sensor detects whether the brake fluid pressure corresponds to a normal level.

SUMMARY OF THE INVENTION

Object of the present invention is therefore to provide a method for detecting an incorrect installation of brake lines in a brake system with brake circuits associated to the axles ("front-rear split").

This object is achieved by a method for detecting an incorrect installation of brake lines of a brake system for a multi-axle motor vehicle, with the brake system including a primary circuit including a first ESP subsystem comprised of a primary reservoir for brake fluid and at least one outlet valve, with the primary circuit being associated to the wheel brakes of a first axle, and a secondary circuit including a second ESP subsystem comprised of a secondary reservoir for brake fluid and at least one outlet valve, with the secondary circuit being associated to the wheel brakes of a second axle, with the primary circuit providing a greater brake fluid volume than the secondary circuit, and with two brake lines connecting a tandem brake master cylinder to the primary circuit and the secondary circuit, respectively, which method includes in a first step that the tandem brake master cylinder is actuated to build up pressure while the outlet valves are open so as to completely fill the primary reservoir and secondary reservoir with brake fluid, with the outlet valves being closed as soon as the reservoirs are completely filled, and in a further step that at least one revolving wheel of the first axle is decelerated by maintaining actuation of the tandem brake master cylinder, wherein a measuring device indicates a correct or incorrect installation of the brake lines as a function of the braking behavior.

By "emptying" both brake circuits initially through actuation of the tandem brake master cylinder, while the outlet valves are open, into the corresponding reservoirs, i.e. the brake fluid volume is transferred up to the maximum capacity in the reservoirs, inference can be made during the subsequent deceleration of at least one revolving wheel of the first axle in view of the braking behavior, whether the brake lines have been installed correctly or incorrectly. This is due to the constructive volume dimensioning of the tandem brake master cylinder in combination with the volume difference between primary circuit and secondary circuit. In the event, the brake lines between the tandem master brake cylinder and the two subsystems of the ESP system have been swapped, then, when the at least one wheel of the first axle is decelerated, only the reduced brake fluid volume of the secondary circuit is available to fill the reservoir, which is not sufficient to thereby realize the defined braking behavior. This can be achieved only with correct installation and appropriate use of the primary circuit. Thus, a reliable verification of the installation of the brake lines can be carried out in the absence of any additional measures. There is only need for implementation of an ESP test routine for filling and emptying the reservoirs. The test is preferably carried out at the belt end, where the motor vehicle is moved onto a roller test stand. The operator conducting the test actuates the tandem brake master cylinder preferably manually by depressing the brake pedal and starts the test routine of the ESP control unit with appropriate inputs. The processing of the individual process steps is carried out (semi-) automatically through appropriate communication between vehicle and roller test stand. The outlet valves are standard components in conventional ESP systems, and are connected in a known manner between the wheel brakes and the respective reservoir. A two-axle and two-track vehicle has thus four outlet valves (one for each wheel).

In a preferred configuration, the defined braking behavior is defined by a threshold value of the angular acceleration of the at least one wheel. The wheel is retarded upon actuation of the tandem brake master cylinder and the resultant tightening of the wheel brakes, corresponding to a negative angular acceleration. When the latter exceeds a predetermined threshold value, the presence of a correct installation of the brake lines is concluded. When the threshold value cannot be exceeded, the measuring device indicates a faulty installation, which is to be remedied in a further process step by exchanging the brake lines on the tandem brake master cylinder.

In a preferred configuration, the defined braking behavior is defined by a threshold value for a time period up to a standstill of the at least one wheel. The wheel is retarded upon actuation of the tandem brake master cylinder and the resultant tightening of the wheel brakes up to the standstill (angular velocity equal to zero). For this, a certain time period is necessary in dependence on the applied brake pressure. When the latter exceeds a predetermined threshold, the presence of a faulty installation of the brake lines is concluded, which is to be remedied in a further process step by exchanging the brake lines on the tandem brake master cylinder. When the applied brake pressure is, however, able to drop below the threshold value, the measuring device indicates a correct installation of the brake lines.

In a preferred configuration, the at least one wheel of the first axle is rotated on a roller test stand with a defined initial angular velocity. This is preferably implemented without participation of the drive unit of the motor vehicle and ensures constant starting conditions. When the predetermined initial angular velocity has been reached, the measuring device starts recording. The tandem brake master cylinder remains actuated from the beginning of the test routine by depressing the brake pedal. In a particularly preferred configuration, the roller test stand includes the measuring device which outputs, after completion, the test result to the operator executing the process.

In a preferred embodiment, the reservoirs are at least partially emptied during a final process step by opening the outlet valves. This relieving step in itself is not necessary for detecting the incorrect installation of the brake lines, but restores the operativeness of the braking system at the conclusion of the process.

BRIEF DESCRIPTION OF THE DRAWING

Further details and features of the present invention will become apparent from the following description of a preferred exemplified embodiment with reference to the drawing.

The sole FIGURE shows a schematic representation of the brake system.

DETAILED DESCRIPTION OF PREFERRED EMBODIMENTS

According to the FIGURE, a brake system 1 for a multi-axle, here a two-axle, motor vehicle has a tandem brake master cylinder 12 of a known type, which can be manually operated by a brake pedal 14. Two brake lines 10 and 11 are connected to the tandem brake master cylinder 12, leading to an ESP subsystem 3 or 7, respectively. Each ESP subsystem 3 and 7 has, in addition to the illustrated fluid lines and valves, furthermore a conveying device 5 and 9, which can be powered by a common motor M, as well as reservoirs 4 and 8 for brake fluid. By switching the corresponding outlet valves 13, the reservoirs 4 and 8 can be filled or emptied either by the brake pressure generated by the tandem brake master cylinder 12, or by the conveyors 5 and 9, respectively. Connected to the ESP subsystems 3 and 7 are wheel brakes VL, VR and HL, HR, each associated to a wheel. In a correctly installed state, the brake line 10, the ESP subsystem 3, comprised of primary reservoir 4, first conveying device 5, the two outlet valves 13 and the wheel brakes VL, VR form i.a. the primary circuit 2 of the first axle of the motor vehicle (front axle). The lines and switching elements, illustrated in the FIGURE between brake line 10 and the wheel brakes VL, VR of the front axle belong, of course, also to the primary circuit 2 but are not discussed in this context any further. The brake line 11, the ESP subsystem 7, comprised of secondary reservoir 8, second conveying device 9, the outlet valves 13, and the wheel brakes HL, HR form the secondary circuit 6 of the second axle of the motor vehicle (rear axle), when correctly installed. The lines and switching elements, illustrated in the FIGURE between brake line 11 and the wheel brakes HL, HR of the rear axle belong, of course, also to the secondary circuit 6 but are not discussed in this context any further. The tandem brake master cylinder 12, the primary circuit 2, and the secondary circuit 6 are designed such that the primary circuit 2 has a greater brake fluid volume than the secondary circuit 6.

At the start of the test routine, a person carrying out the test depresses the brake pedal 14 to thereby actuate the tandem brake master cylinder 12 in a manner to build up hydraulic pressure in the brake system 1. A not shown ESP control unit is then switched to a test mode, so that at least the outlet valves 13 of the primary circuit 2 and of the secondary circuit 6 are opened. The brake fluid pressure built up by the tandem brake master cylinder 12 in the brake system 1 now causes the reservoirs 4 and 8 to be filled with brake fluid from the two brake circuits 2 and 6 up to their respective maximum, with the primary reservoir 4 being able to provide more volume than the secondary reservoir 8. Then, the wheels of the first axle are brought on a not shown roller test stand to a defined angular velocity, and a measuring device of the roller test stand is readied for recording. By maintaining actuation of the tandem brake master cylinder 12, the wheels of the first axle are decelerated by the wheel brakes VL, VR, with the measuring device determining whether the actually measured braking behavior corresponds to a predefined braking behavior. If this is the case, it is concluded that the brake lines 10 and 11 have correctly been installed. When the measured braking behavior does not reach the predefined braking behavior, the presence of an incorrect installation of the brake lines 10 and 11 is encountered. Finally, the test routine is terminated by returning the brake system 1 to its original state through opening of the outlet valves 13.

What is claimed is:

1. A method for detecting a correct installation or an incorrect installation of a brake line of a brake system for a multi-axle motor vehicle, with the brake system including a primary circuit associated with wheel brakes of a first axle and providing a first brake fluid volume, and a secondary circuit associated with wheel brakes of a second axle and providing a second brake fluid volume which is less than the first brake fluid volume, said method comprising:

opening an outlet valve of a first Electronic Stability Program (ESP) subsystem of the primary circuit and an outlet valve of a second ESP subsystem of the secondary circuit, while actuating a tandem brake master cylinder, connected by the brake lines to the primary and secondary circuits, and building up pressure and thereby completely filling a primary reservoir of the first ESP subsystem and a secondary reservoir of the second ESP subsystem with brake fluid;

closing the outlet valves of the first and second ESP systems when the primary and secondary reservoirs are completely filled;

continuing to maintain actuation of the tandem brake master cylinder to thereby decelerate at least one revolving wheel of the first axle and determine a corresponding braking behavior; and determining by a measuring device the presence of a correct or incorrect installation of the brake lines as a function of the braking behavior.

2. The method of claim 1, wherein the measuring device determines whether the braking behavior corresponds to a defined braking behavior which is defined by a threshold value of an angular acceleration of the at least one wheel.

3. The method of claim 1, wherein the measuring device determines whether the braking behavior corresponds to a defined braking behavior which is defined by a threshold value for a time period up to a standstill of the at least one wheel.

4. The method of claim 1, further comprising rotating the at least one wheel of the first axle on a roller test stand at a defined initial angular acceleration.

5. The method of claim 4, wherein the roller test stand includes the measuring device.

6. The method of claim 1, further comprising emptying the primary and secondary reservoirs, at least in part, in a final step by opening of the outlet valves.

* * * * *